(12) United States Patent
Schiller

(10) Patent No.: US 6,195,448 B1
(45) Date of Patent: Feb. 27, 2001

(54) FINGER IMAGING APPARATUS

(76) Inventor: Michael Schiller, 4421 Douglas Ave., Townhouse No. 1, Riverdale, NY (US) 10471-3513

(*) Notice: Subject to any disclaimer, the term of this patent is extended or adjusted under 35 U.S.C. 154(b) by 0 days.

(21) Appl. No.: 09/071,490

(22) Filed: May 1, 1998

Related U.S. Application Data

(63) Continuation-in-part of application No. 08/808,248, filed on Feb. 28, 1997, now abandoned.

(51) Int. Cl.[7] ........................................................ G06K 9/00
(52) U.S. Cl. .............................. 382/126; 382/127; 356/71
(58) Field of Search ..................................... 382/124, 125, 382/126, 127, 204, 205, 209, 210, 211, 260–265, 312; 356/71

(56) References Cited

U.S. PATENT DOCUMENTS

| | | | |
|---|---|---|---|
| 4,544,267 | * | 10/1985 | Schiller .................................... 356/71 |
| 4,783,167 | * | 11/1988 | Schiller et al. .......................... 356/71 |
| 4,787,742 | * | 11/1988 | Schiller et al. .......................... 356/71 |
| 4,936,680 | * | 6/1990 | Henkes et al. ........................... 356/71 |
| 5,177,353 | * | 1/1993 | Schiller .................................... 356/71 |
| 5,650,842 | * | 7/1997 | Maase et al. ............................ 356/71 |
| 5,736,734 | * | 4/1998 | Marcus et al. ......................... 250/225 |

* cited by examiner

*Primary Examiner*—Phuoc Tran
(74) *Attorney, Agent, or Firm*—Reed Smith LLP

(57) ABSTRACT

In an optical finger image system, a platen is provided to receive and support a finger to be interrogated. A light beam source orients an interrogating light beam onto the platen, so that the beam forms a shallow angle with the platen and intersects the platen at a trace. The light beam illuminates ridge, valley, and ridge/valley edge portions of the finger. An image of the finger generated by the interrogating light beam is focused by imaging optics onto an image plane. A photo-electric transducer array is positioned at the image plane, the transducer array having a window region. The window region is positioned such that illuminated ridge and ridge/valley edge portions of the finger are imaged within the window; while illuminated valley portions of the finger are not imaged in the window. The angle of the light beam incident on the platen is compounded to generate an image of enhanced brightness at ridge/valley edges.

30 Claims, 8 Drawing Sheets

FINGER IMAGING APPARATUS

REFERENCE TO RELATED APPLICATION

This application is a continuation-in-part of U.S. patent application Ser. No. 08/808,248 filed on Feb. 28, 1997 abandoned.

BACKGROUND OF THE INVENTION

This invention relates to an optical finger image generating apparatus. In particular, the invention relates to an apparatus for generating an image from an optical scan of a finger supported on a platen.

A number of techniques are known for generating an image which is equivalent to an inked fingerprint. In many finger imaging devices, a fingerprint image is stored as electronic data and evaluated by a computer to identify a person or to verify the identity of the person. Such systems are useful, for example, in security systems which restrict access to locations or equipment. The capabilities of such identification systems and other systems relying on a finger imaging apparatus are limited by the difficulty of providing a finger imaging apparatus which is both convenient to use and which provides a clear, consistent finger image. Features of the finger such as bifurcations and endings of ridges and valleys are especially important for fingerprint identifications.

Systems have been developed which employ a layer of liquid to improve the imaging of ridge and valley portions of the finger. The use of a liquid layer, however, tends to filter out important details in the finger image. In addition, systems involving a liquid layer are messier and more inconvenient than systems using a dry finger. Accordingly, a system capable of providing a finger image with a high level of contrast between ridge and valley portions as well as a high level of detail is necessary for accurate fingerprint identification.

Because the finger surface may have cracks or other features which interfere with proper imaging of the ridges and valleys of the finger, it is often desirable to filter the finger image in order to eliminate such features while keeping the minutae which are used in fingerprint identification. The use of a finger imaging apparatus with a liquid layer filters out unwanted features, but the level of filtering cannot be controlled and even important minutae of the finger may be filtered out of the image. In systems employing a dry platen, filtering of the finger image may be performed electronically, but such filtering requires additional costly electronic equipment.

Several prior art finger imaging devices make use of frustrated total internal reflection (frustrated TIR). In such systems, light is incident on a transparent platen at an angle below the critical angle. In a region where nothing is in contact with the platen, e.g. at a valley portion of a finger in contact with the platen, the incident light is reflected from the platen. A photodetector is oriented to image light experiencing TIR from the platen. Where something such as a ridge portion of the finger is in contact with the platen, the TIR does not take place, and the ridge portion is imaged as a dark region by the photodetector. However, residual material on the platen can also frustrate TIR and result in a dark portion of the finger image. This is especially problematic in the case of traces of finger oil left on the platen by previously imaged fingers. The finger oil frustrates TIR and results in detection of a ghost image of the earlier finger. This reflected "noise" interferes with the generation of an accurate finger image.

It is an object of the present invention to provide an optical finger imaging apparatus. In particular, it is an object of the present invention to provide such an apparatus which generates a finger image from an optical scan of a finger supported on a platen.

In particular, it is an object of the invention to provide an apparatus which generates a finger image with a high contrast between ridge and valley portions.

A further object of the present invention is to provide an apparatus which generates a finger image with a high resolution.

An additional object of the present invention is to provide a finger imaging apparatus which enables a controlled level of optical filtering of the finger image.

A further object of the present invention is to provide a finger imaging apparatus which overcomes the problem of noise from platen residue.

These and other objects of the present invention will be apparent from the drawings and detailed descriptions herein.

BRIEF DESCRIPTION

In an optical finger image system according to the present invention, a platen is provided, which has a touching surface to receive and support a finger to be interrogated. A light beam source is positioned optically upstream from the platen to provide an interrogating light beam. The interrogating light beam provides a trace at the touching surface of the platen. Preferably, the light beam is substantially planar, so that the trace has the shape of a slit (i.e., the maximum length of the trace across the platen is much larger than the maximum width of the trace). The light beam source is oriented with respect to the platen such that the light beam forms a predetermined angle $\phi$ with the touching surface of the platen where the light beam exits the touching surface of the platen. The light beam illuminates ridge and valley portions of the finger. An imaging optical system, such as a converging lens system, projects onto an image plane light from the interrogating light beam which is scattered by the finger. A photoelectric transducer such as a linear CCD array is located at the image plane, preferably with the optic axis at a right angle to the touching surface of the platen. Light registered by the photoelectric transducer is restricted to light within a window area optically downstream from the finger. The window area, which may be delimited by a light-sensitive area of the CCD array, is positioned such that an illuminated ridge portion of the finger is imaged within the window. The predetermined angle $\phi$ is sufficiently small such that any image which may be generated of an illuminated valley portion of the finger is imaged outside the window. The optical finger image system includes a scan mechanism operatively coupled to the light beam source, the imaging optics, and the photoelectric transducer for moving the trace across the platen.

Where $h_{min}$ is selected as a minimum depth of a valley portion of the finger to be imaged, v is an overlap distance between an image of the trace and the transducer, and m is the magnification of the image, the optical finger image system is arranged such that $h_{min}=(v/m)\tan\phi$. In general, the predetermined angle $\phi$ is no more than approximately 30°.

The platen may be planar, prismatic, or curved in shape and further may be provided with an antireflective coating. The platen may be formed out of glass or a "softer" material such as a transparent epoxy or other transparent polymeric material.

The interrogating light beam includes a central ray, and a perpendicular projection of the central ray on the touching surface forms a predetermined angle α with the trace. The central ray forms an angle θ with the projection thereof of the touching surface. The angles α, φ, and θ satisfy the equation sinα·tanφ=tanθ. The predetermined angle α is preferably approximately 45°.

DETAILED DESCRIPTION OF THE INVENTION

Figure 1:
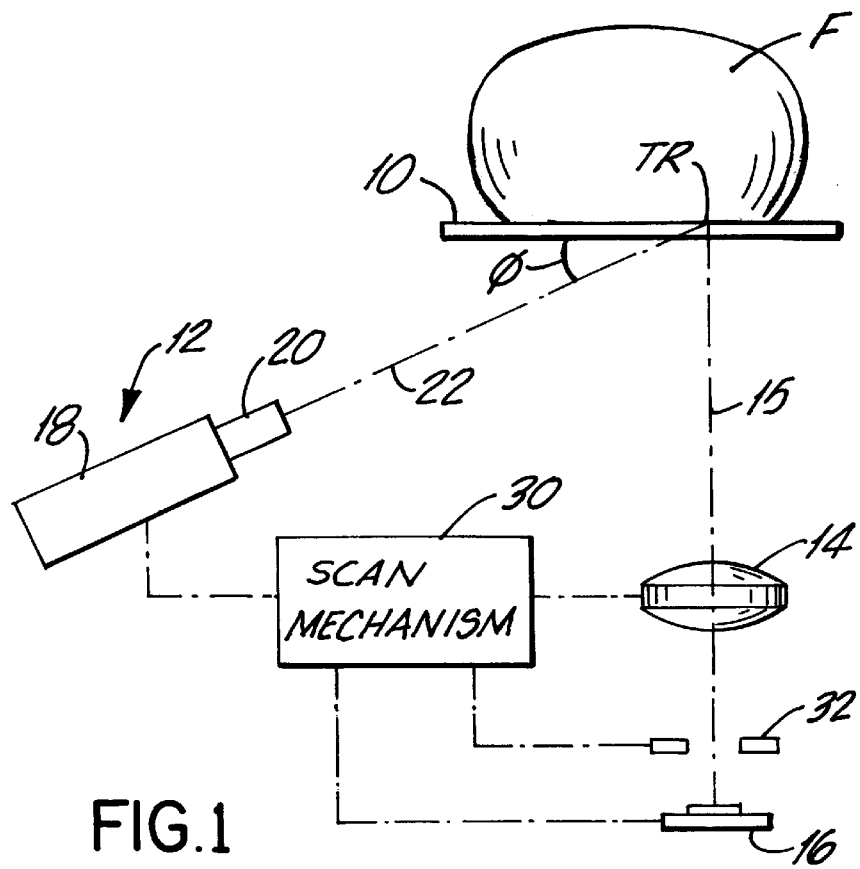
FIG. 1 is a schematic illustration of an embodiment of a finger imaging apparatus in accordance with the present invention.

In a finger imaging apparatus as illustrated in FIG. 1, an optically transparent platen 10 is provided for receiving a finger F pressed against the touching surface thereof. A light source 12 illuminates finger F from the side of platen 10 opposite finger F. A portion of finger F which is illuminated by light from light source 12 is focused by imaging optics 14 onto an image plane, where a photoelectric transducer 16 at the image plane detects a portion of the focused image falling inside a window 32. Imaging optics 14 can be a converging lens system. Imaging optics 14 may further include one or more mirrors (not illustrated) to fold the path of light, thus resulting in a more compact optical system. Optic axis 15 is an axis which extends from trace TR on platen 10 and follows the path of a light ray through the symmetric center of imaging optics 14 and to photoelectric transducer 16.

Figure 2:
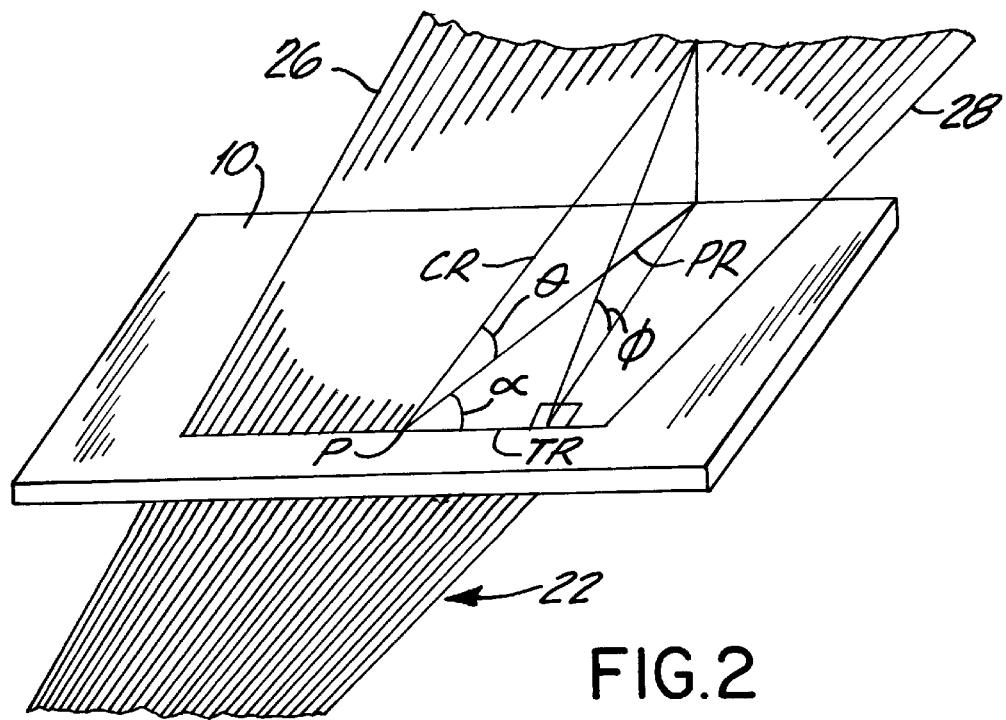
FIG. 2 is a schematic illustration of a platen and light source of a finger imaging apparatus in accordance with the invention, showing the orientation of a light beam in relation to the touching surface of the platen.

Light source 12 includes a laser source 18 and fan beam optics 20. Fan beam optics 20 shape the light from laser source 18 into a substantially planar fan-shaped beam 22. Each of the rays of light in beam 22, such as a central ray CR and lateral rays 26 and 28, lies substantially in a common plane. Beam 22 is not precisely planar, of course. After traveling a distance of a few inches from light source 12 to platen 10, beam 22 will typically have a thickness of around 2 mils (2×10$^{-3}$ in) and a length of approximately 1.8 inches. With a value of φ=27°, trace TR will then have a thickness of approximately 4 mils. As illustrated in FIG. 2, the intersection of beam 22 with the touching surface of platen 10 is a thin trace TR having the shape of a slit or band. It is not necessary for beam 22 to diverge a fan shape. Beam 22, for example, could be comprised of parallel or convergent rays. However, in order to form a slit-shaped trace TR, the use of a fan-shaped beam 22 simplifies beam optics 20.

The plane of beam 22 forms an angle φ with the plane of platen 10. Because beam 22 may be oriented at a compounded angle with respect to platen 10, as illustrated in FIG. 2 and discussed in further detail below, the angle φ between the platen and the beam is not necessarily equal to the angles made by individual light rays such as central ray CR with the platen.

It is to be understood that beam 22 will be refracted according to well-known laws of geometric optics as it passes through platen 10, which will be readily accounted for by one familiar with optics. In one embodiment of the finger imaging apparatus, platen 10 has parallel planar upper and lower surfaces, so that the angle φ is the same above and below platen 10. However, it is possible to provide a platen having a prismatic shape and illuminating from a sloping side of the prism, as that disclosed in U.S. Pat. No. 5,177,353, or to provide a platen having a curved shape, such as that disclosed in U.S. Pat. No. 4,783,167. While beam 22 may be refracted several times before exiting the touching surface of the platen, angle φ and all other angles measured between beam 22 and platen 10 are defined as the angle between the touching surface of platen 10 and the portion of beam 22 traveling above platen 10, once beam 22 exits platen 10. Similarly, trace TR is defined as the intersection of beam 22 with the touching surface of the platen. In the case of a curved platen, the angles of beam 22 are taken with respect to a plane tangential to the platen at the intersection of beam 22 with the touching surface of the platen.

Since intersections of lines and planes form both acute and obtuse angles, only the angles less than or equal to 90° will be considered herein in order to avoid any ambiguity.

Light source 12 may arranged to direct beam 22 onto platen 10 at a compounded angle, as illustrated in FIG. 2. Central ray CR intersects platen 10 at a point P on trace TR. A perpendicular projection PR of central ray CR onto platen 10 additionally intersects trace TR and ray CR at point P. Central ray CR forms an angle θ with projection PR, while projection PR forms an angle α with trace TR. Angle α and angle θ together measure the obliquity of beam 22 with respect to platen 10. Where beam 22 is substantially planar, angle φ is defined as the angle of the plane of beam 22 with the touching surface of platen 10. With the application of trigonometry to the angle definitions given above, it is seen that the angles α, θ, and φ are related by the equation:

$$\sin\alpha \cdot \tan\phi = \tan\theta.$$

It is to be noted that the precise values of angles α and θ depend somewhat on which ray of beam 22 is considered to be the central ray CR, a selection which is somewhat arbitrary. Because beam 22 typically fans out as it travels from source 12 to platen 10, central ray CR and lateral rays 26 and 28 are not necessarily parallel to one another, and each will strike platen 10 with different values of θ and α. However, as will be further discussed below, the desired results of providing an oblique beam 22 are achieved within a broad range of angles, and a precise determination of obliquity is not necessary. Accordingly, the designation of a particular ray of beam 22 as central ray CR is not critical, and such a designation may proceed, for example, by selecting a ray intersecting trace TR at point P such that point P is approximately in the center of trace TR. In an embodiment where all of the rays in beam 22 are parallel, any ray may be selected as central ray CR with equivalent results. Central ray CR is typically selected as being a weighted average central ray, essentially the "center of gravity" of beam 22. For a typical beam employed in a finger imaging apparatus, lateral rays 26 and 23 each diverge by about 10° from central ray CR, while θ preferably has a value of around 20° and α has a value of around 45°.

A scan mechanism 30, such as those disclosed in U.S. Pat. No. 4,544,267, is coupled to light source 12, imaging optics 14, window 32, and photoelectric transducer 16 and moves them relative to platen 10 in a direction substantially perpendicular to the trace TR, so that trace TR scans across platen 10. It is not essential that the direction of the scan be perpendicular to the trace, but a scan perpendicular to the trace is preferred. During the scans finger F on platen 10 is subjected to a moving slit of illumination. The illuminated portion of finger F is imaged by imaging optics 14 onto the image plane, where the portion of the image falling within window 32 is detected by photoelectric transducer 16. Transducer 16 is preferably a linear charge-coupled device (CCD) array, aligned at the image plane along the image of the trace.

Platen 10 is generally a dry platen, although a small amount of finger oil will typically collect on the platen during use. A platen with a natural buildup of finger oil or components of perspiration is considered herein to be a dry platen, in so much as such a buildup does not fluidly fill the finger valleys.

Window 32 is illustrated schematically in FIG. 1 as an opening for the passage of light formed through a separate component; however, the term "window" as used herein is intended to encompass more broadly the concept of an area capable of accepting light, which delimits an area in which light may be detected. Such a window may be a physical window, e.g., an opening in an opaque object positioned at or near finger F, transducer 16, or the plane of any intermediate image (not illustrated) where imaging optics 14 is comprised of multiple lenses. Alternatively, a window may be a functional area. For example, where transducer 16 is a linear CCD array, the window of the array may be the physical boundaries of the CCD itself, outside of which incident light does not induce an electrical signal. In one embodiment, transducer 16 is a two-dimensional CCD array. In that case, the window may be defined either mechanically or electronically. To define the window mechanically, all but a selected portion of the CCD array may be blocked out by an opaque object. For example, an object with a slit-shaped opening may block out all but a selected row or rows of the CCD array, and may move across the CCD array with the scan. To define the window electronically, the entire two-dimensional CCD array is exposed, and image data not falling within a selected window area is disregarded in constructing a finger image.

A two-dimensional finger image is generated from a one-dimensional array by storing the signals from the CCD array for each one of multiple positions along the length of the scan. Thus, in an image stored as an X-Y matrix for computer analysis, the X value can represent the location of a particular CCD along the linear array of CCDs, and the Y value can represent the position of the array along the length of the scan, while a value representing illumination is stored for each X-Y position in the matrix. The generation of a two-dimensional image from a one-dimensional scan is well-known in a variety of applications. The resulting two-dimensional finger image may be displayed on a CRT or other display device or printed as a hard copy by a printer for examination by a human operator, or the image may be processed entirely by a computer. Various techniques of fingerprint analysis are well known in the prior art.

A beam 22 having a thickness of around 2 mils and a width of around 1.8 inches, i.e. a narrow, slit-shaped beam, is preferred. A slit beam provides a more efficient use of light than a broad beam because a greater fraction of the light can fall within the window. In addition, the use of a slit beam facilitates alignment of the finger imaging apparatus. To align a finger imaging apparatus employing a slit beam, a flat, black and white patterned paper target is placed on platen 10. The apparatus is adjusted until the target pattern image is read by CCD array 16, and the focus is adjusted to sharpen the contrast between black and white pattern areas. The contrast may be observed with an oscilloscope graphically displaying illumination along CCD array 16.

ALIGNING THE CCD ARRAY

The alignment of the CCD array is important in determining type of finger image that will be obtained. In general, there are two types of alignment. In the first, "centered alignment," the CCD array and the trace are both aligned on the optic axis of the imaging optics and parallel to one another. In order to obtain such an alignment, the position of the CCD array is adjusted to until the oscilloscope registers a maximum of intensity, indicating that the CCD array is aligned with the image of the trace. As will be further explained below, the image that results from a centered alignment is predominantly a valley image of the finger (i.e., an image in which the ridge/valley edges appear substantially brighter than the ridges).

In the second type of alignment, "offset alignment," the CCD array is first aligned to the center of the trace image as described above, and subsequently offset laterally (in a direction perpendicular to the CCD array). Preferably, the CCD array is offset by such a distance that the intensity of light registered on the oscilloscope is one-half of the maximum light intensity registered before the offsetting of the CCD array. The image that results from an offset alignment is a ridge image (i.e., an image in which the ridges appear substantially brighter than the edges).

VALLEY IMAGE

Figure 3A:
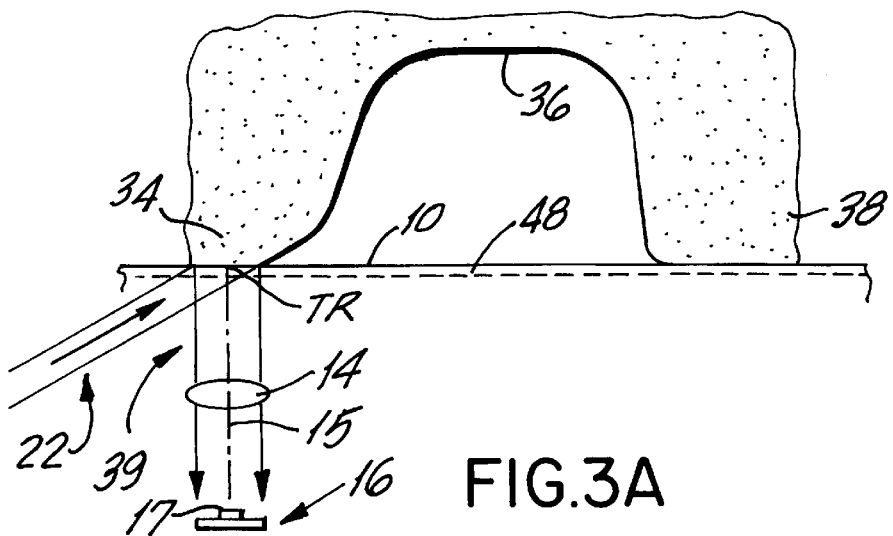
FIGS. 3A–3C are schematic views of a finger surface on a platen, showing successive steps in the imaging of the finger surface in accordance with the invention.
Figure 3B:
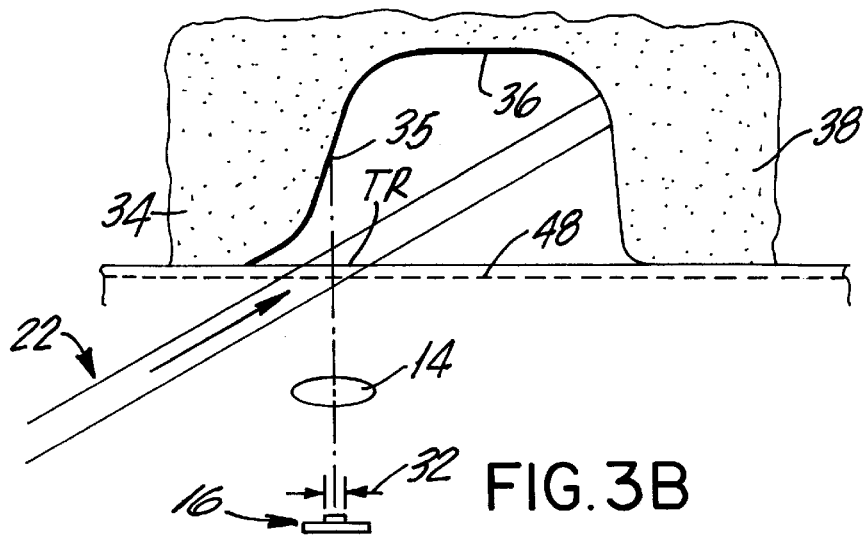
Figure 3C:
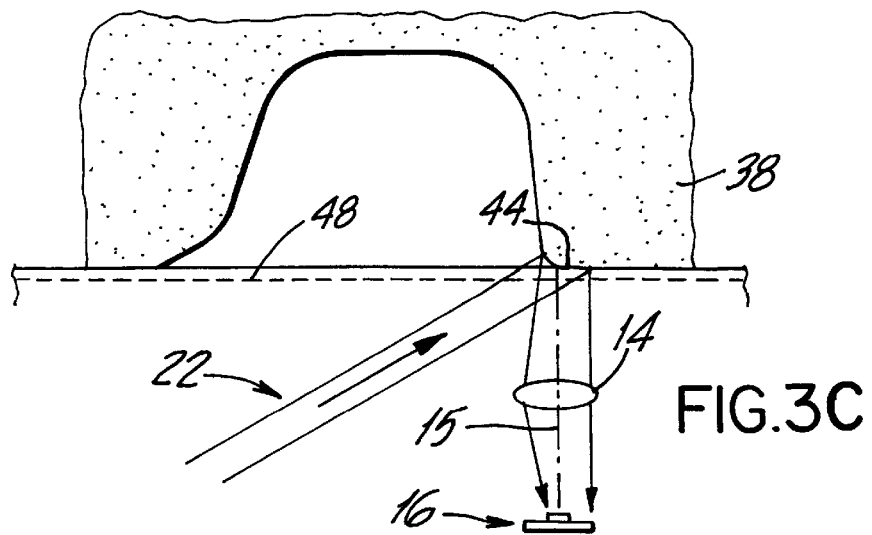

In order to obtain a valley image of a finger, CCD array 16 is aligned with the center of the trace image, for example by using the "centered alignment" procedure described above. The finger F is pressed on platen 10 for the duration of a scan. The process of scanning the ridge and valley features which make up the fingerprint of finger F to generate a valley image is schematically illustrated in FIGS. 3A–C, wherein ridges 34 and 38 of finger F are in contact with the touching surface of platen 10. The ridges are separated by a valley, or recessed portion, with a valley floor 36 and a ridge/ridge/valley edge. In FIGS. 3A–C, ridges 34 and 38 and valley 36 extend approximately parallel to trace TR, perpendicular to the plane of the drawings. Trace TR and pixel 17 of CCD array 16 are aligned with optic axis 15, which passes through the center of imaging optics 14.

FIG. 3A illustrates the portion of the scan during which beam 22 strikes ridge 34 at trace TR. Light from beam 22 scatters off ridge 34, and a portion 39 of the scattered light is directed toward imaging optics 14 and transducer 16. Light which scatters in other diverse directions does not reach transducer 16 and is not illustrated. Window 32 (illustrated in FIG. 3B) is defined by the extent of pixel 17. Since pixel 17 (and thus window 32) is in optical alignment with trace TR, light which is scattered at the trace, for example by a ridge in contact with the touching surface of the platen, is imaged onto the photoelectric transducer, thus registering as a "light" area of the finger image.

Since, in one embodiment, the light source, the window, the imaging optics, and the photoelectric transducer each are held in the same relative positions while all are being translated by the scan mechanism in a motion relative to the platen, the optical alignment of the trace, the window, the imaging optics, and the transducer is maintained throughout the scan. As one of many alternatives, the scanning motion relative to the platen may be effected where the platen is in motion and the light source, the window, and the imaging optics are stationary. In this case, the motion of the platen may be effected by force applied by the finger itself, and the scan mechanism may include a position encoder, to record the position of the platen.

As illustrated in FIG. 3B, as the scan progresses, beam 22, together with trace TR, continues to sweep across platen 10 and past ridge 34, until beam 22 strikes inside recessed valley portion 36. Because valley 36 is not in contact with platen 10, beam 22 continues to travel laterally, past trace TR, before finally scattering off valley 36. Scattered light from the illuminated portion of valley 36 is directed well outside of window 32 and is not imaged onto transducer 16. Thus, the image of the illuminated portion of valley 36 is offset or displaced from window 32. A valley region 35 is in optical alignment with window 32, so that an image of region 35 would fall within window 32; however, valley region 35 is not illuminated by beam 22 and thus registers as a "dark" area of the finger image.

In FIG. 3C, the scan reaches the edge of valley 36, illuminating a region 44. Because region 44 is near platen 10, light 46 scattered from region 44 is again directed within window 32 and registers as another "light" area of the finger image. The image of ridge/valley edge region 44, however, appears even brighter than the image of a flat ridge portion, such as in FIG. 3A. Because of the more direct illumination of ridge/valley edge 44 (i.e., the orientation of edge region 44 more perpendicular to beam 22) and the narrower projection of ridge/valley edge 44 in the direction of the imaging optics, the amount of scattered light coincident with the optic axis is intensified and edge 44 registers as an area of enhanced brightness of the finger image. Light scattered from the finger, which is a three dimensional object, is projected onto the image plane, which is two-dimensional, and light scattering from edge 44 of the valley is summed in the image plane.

An image consisting only of those regions of enhanced brightness is a valley image of the finger, thus, an image including dark valley floors, light ridges, and ridge/valley edges of enhanced brightness has both ridge image information and valley image information. To generate a valley image from the edge regions of enhanced brightness, an image obtained by a scan as illustrated in FIGS. 3A–3C can be processed electronically to include only the regions of enhanced intensity, or the image may be filtered by a low-pass spatial frequency filter, as described in further detail below.

The relative light intensity levels of the edge regions and the ridge regions can be controlled by varying the angle $\phi$ of the beam, with a smaller angle $\phi$ resulting in a higher contrast between ridge regions and ridge/valley edge regions. As $\phi$ is decreased and the beam strikes the finger at a more shallow angle, the amount of light scattered from the ridge surface in the direction of the imaging optics is reduced, so the light intensity of the ridge portion of the image is reduced. On the other hand, at a shallow angle $\phi$, the light beam strikes ridge/valley edge portions more directly, resulting in an even greater enhancement of light intensity.

In order to image a larger portion of the finger, a person whose finger is being imaged may roll the finger across the platen along with the scanning movement of the trace. A monitor may be provided to aid the person in tracking the trace.

RIDGE IMAGE

Figure 4A:
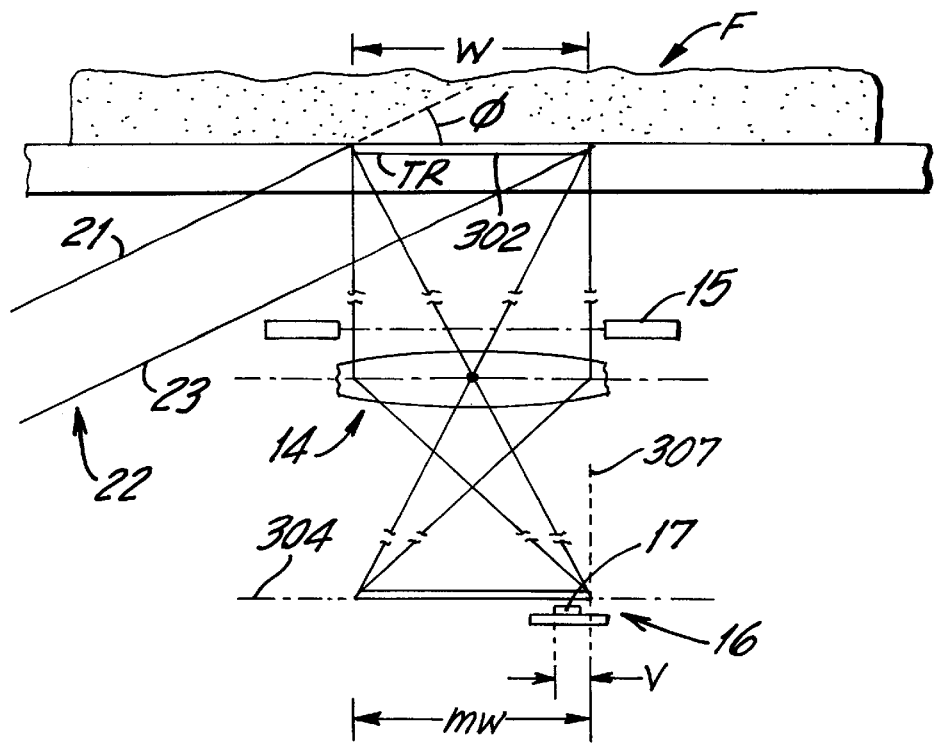
FIGS. 4A–4B are schematic views of a finger surface on a platen, showing successive steps in the imaging of the finger surface in accordance with the invention.
Figure 4B:
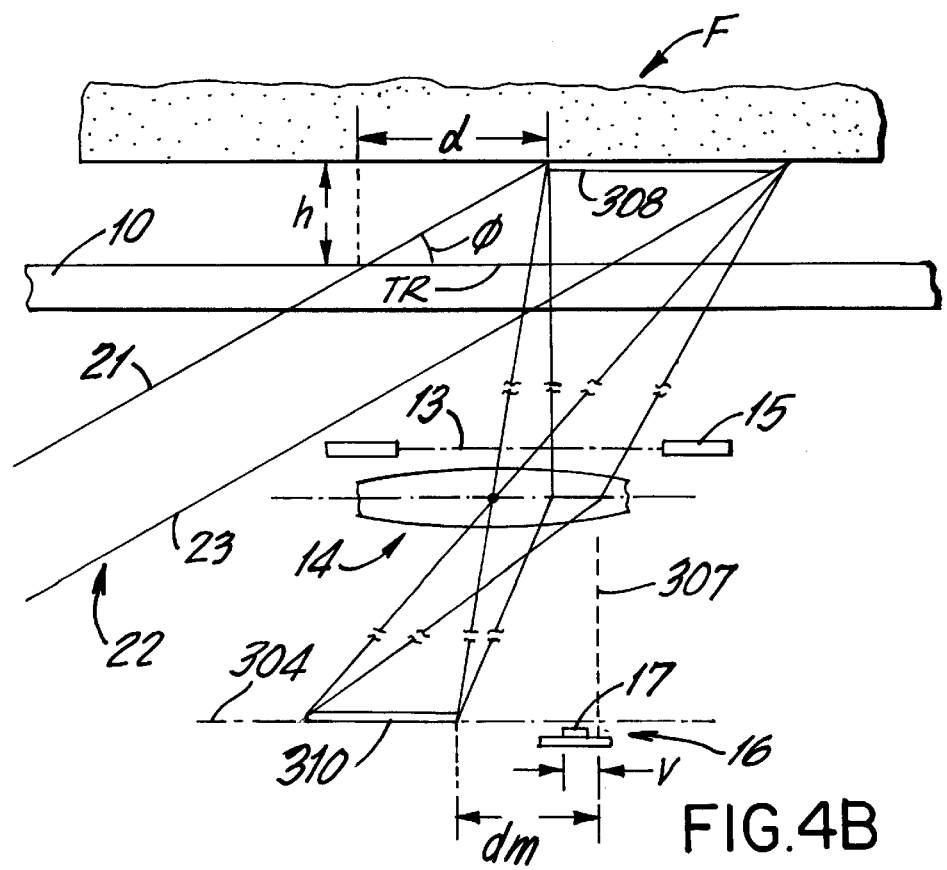

The steps involved in generating a ridge finger image are detailed in FIGS. 4A–B. In FIGS. 4A–B, as in FIGS. 3A–C, trace TR is perpendicular to the plane of the drawings. FIGS. 4A and 4B are drawn in an enlarged scale relative to FIGS. 3A–C. In FIG. 4A, a ridge portion of finger F is illustrated in cross section extending approximately perpendicular to trace TR. Beam 22, also in cross section, strikes a portion 302 of finger F which is in contact with platen 10. Beam 22 is a slit beam bordered on either side with a planar outer edge 21 and a planar inner edge 23. CCD array 16 is offset from the center of slit image 306. Such an alignment is obtained, for example, by the offset alignment procedure described above.

When beam 22 is substantially planar, or at least collimated, outer edge 21 and inner edge 23 strike platen 10 at the same angle $\phi$. Where, however, outer edge 21 and inner edge 23 strike platen 10 at different angles (not illustrated), for example because of divergence in beam 22 or curvature in platen 10, the definition of angle $\phi$ is refined to state that $\phi$ is the angle between the plane of outer edge 21 and the touching surface of platen 10.

Illuminated portion 302 of finger F is coextensive with trace TR wherever portion 302 is in contact with platen 10. Imaging optics 14 generates an image 306 of illuminated portion 302 on image plane 304. Image 306 of the finger is coextensive with the image of the trace wherever the finger is in contact with the platen. Trace TR has a trailing edge 305, which is imaged on image plane 304 at an edge indicated by dashed line 307. The "trace image" is considered herein to be the location of an image which would be projected con image plane 304 of light scattered at trace TR on platen 10, whether or not light actually is reflected at trace TR. The high level of predictability in imaging optics enables localization of the trace image whether or not the image is illuminated.

In a preferred configuration, linear CCD array 16 and the touching surface of platen 10 are mutually parallel and are both perpendicular to optic axis 15. Divergence from such a configuration introduces trapezoidal distortions in the finger image.

A portion of image 306 falls on a CCD pixel 17 of linear CCD array 16, registering as a light portion of the finger image. The physical extent of pixel 17 defines the extent of the window 32, so no additional element is employed to delimit window 32. An overlap of distance v is provided between the image of the trace edge, at line 307, and the opposite edge of pixel 17. Where a separate physical window is provided, which prevents light scattered from the finger from being imaged over the entire surface of pixel 17, only the portion of the pixel which is capable of registering an image from the finger is considered in the determination of the overlap distance.

In FIG. 4B, a valley portion of finger F is illustrated in cross section extending approximately perpendicular to trace TR. Beam 22 strikes a portion 308 of finger F. Illuminated portion 308 is positioned at a height h from the touching surface of platen 10. Portion 308 is, for example, a valley portion of a fingerprint. As discussed above, the plane of beam 22 forms an angle $\phi$ with the touching surface of platen 10. Accordingly, illuminated portion 308 is displaced horizontally from trace TR by a distance d, with d=h/tan$\phi$. Optics 14 forms an image 310 of illuminated portion 308 on image plane 304. Image 310 is displaced by a distance dm from the edge 307 of the trace image, that is, the displacement on image plane 304 is the product of d and m, where m is the magnification of the imaging optics. Since displacement dm is greater than overlap v, none of image 310 falls within the window of CCD pixel 17, thus registering as a dark portion of the finger image.

Of course, since valley 308 is slightly displaced from platen 10, valley image 310 is slightly out of focus and reduced in intensity on image plane 304. This effect, however, is minimal, and the quality of the resultant image is not substantially diminished.

In a scan of the finger, ridge portions of the fingerprint in contact with the platen register as light areas since ridge images fall within the window, while valley floor portions and ridge/valley edges register as dark areas, either because the valley image falls outside the window or because the valley is shadowed from illuminating light by an adjacent ridge. In particular, images whose displacement dm in the image plane are greater than the overlap v do not fall within the window, and are registered as dark areas. Thus, in order for a valley portion of the finger to appear dark in the finger image, even where that portion of the finger is not shadowed by an adjacent ridge, it is sufficient for the inequality dm>v to hold. Since d=h/tan $\phi$, the inequality may be expressed as: hm/tan $\phi$>v, or:

$$h > (v/m)\tan \phi. \quad (1)$$

This inequality can be used to select particular geometric parameters for construction of a finger imaging apparatus. Where it is desirable for valleys having a depth greater than $h_{min}$ to appear as dark portions of a finger image, one need merely select a combination of v, m, and $\phi$ such that:

$$h_{min} = (v/m)\tan \phi. \quad (2)$$

According to one embodiment of the finger imaging apparatus, the overlap v is selected to be on the order of 1 mil (i.e., 1×10$^{-3}$ inches), since 1 mil is a commonly available spacing between pixels of CCDs. Of course, overlap v can be made adjustable by a screw or other adjustment mechanism (not illustrated) acting on one or more of light source 12, platen 10, optics 14, window 32, or transducer 16. In order to eliminate substantial optical aberrations, the magnification m of the imaging optics is selected to be 1.0. In one embodiment, optics 14 comprises an imaging lens system with a focal length of approximately 75 mm, with planar mirrors positioned along the optical path to minimize by "folding" the overall size of the apparatus.

While the valley depth in a heavily worn finger can approach zero, a practical system generally images valleys having a depth greater than 0.5 mil, i.e. $h_{min}$=0.5 mil, With a choice of approximately $\phi$=27°, v=1 mil, and m=1.0, the value of (v/m) tan $\phi$ is approximately 0.5 mil, and the equation $h_{min}$=(v/m) tan $\phi$ is satisfied. Adjustment of the various parameters can obviously be performed following these guidelines to generate different embodiments of the finger imaging apparatus.

A beam 22 having a thickness of around 2 mils and a width of around 1.8 inches, i.e. a narrow, slit-shaped beam, is preferred. A slit beam provides a more efficient use of light than a broad beam because a greater fraction of the light can fall within the window. In addition, the use of a slit beam facilitates alignment of the finger imaging apparatus. To align a finger imaging apparatus employing a slit beam, a flat, black and white patterned paper target is placed on platen 10. Illuminating light is not shadowed on the two-dimensional target pattern. The apparatus is adjusted until the target pattern image is read by CCD array 16, and the focus is adjusted to sharpen the contrast between black and white pattern areas. The contrast may be observed with an oscilloscope graphically displaying illumination along CCD array 16.

As long as the two-dimensional target pattern is imaged in focus over the entire length of CCD array 16, the overlap v for the three-dimensional finger will be no larger than the width of the trace image. Where the width of the trace is expressed as w and the width of the trace image is mw, alignment of the CCD array with the trace image ensures that v≤mw. Thus, inequality (2) is satisfied if w<h/tan $\phi$. In other words, any valley floors with a depth greater than $h_{min}$ are imaged as dark portions of the finger image so long as:

$$w < h_{min}/\tan \phi. \quad (3)$$

That is, a finger image having dark valleys may be obtained by limiting the width of the trace as well as by lowering the angle $\phi$.

More generally, however, the CCD array can be aligned precisely to the center of the trace image. In that case, the overlap v is approximately half of the width of the trace image. Thus, where the CCD array is aligned to the center of the trace image, valley floors with a depth greater than $h_{min}$ are imaged as dark portions of the finger image so long as:

$$w < 2h_{min}/\tan \phi. \quad (4)$$

The value of w generally cannot be reduced below approximately 2 mils. However, inequality (4) can be satisfied for very low values of $h_{min}$ when w is already at 2 mils, by reducing the value of $\phi$.

When images having an exceptionally high contrast and bright intensity peaks are focused onto a CCD, a phenomenon known as "blooming" can result. In blooming, a high level of light at one CCD pixel causes an adjacent pixel to produce a light signal, even if no light strikes the adjacent pixel. It has been found that, by aligning the linear CCD array with an edge of the trace image, blooming can be reduced or eliminated. It has further been discovered that such an alignment produces an image free of ridge cracks and other small, undesirable features of the finger. In that sense, the resulting image is substantially similar to an image produced by prior art systems employing a wet platen.

COMPOUNDING OF THE BEAM ANGLE

As discussed above with respect to FIG. 3C, light from beam 22 which strikes the wall of a ridge generates a region of enhanced brightness on the finger image due to the more nearly perpendicular incidence of beam 22 against the wall of the ridge. Such regions of enhanced brightness on the finger image result in an image of especially high contrast and quality, facilitating any subsequent processing of the image by computer or by manual observation. However, where individual light rays of beam 22 travel in a direction substantially parallel to the ridge, the contrast enhancement effect can be diminished. For this reason, it is desirable for the rays of beam 22 to strike the finger at a compounded angle. That is, it is desirable for the angle α, as defined above and illustrated in FIG. 2, to have a value different from 90°. It has been found that an angle of approximately α=45° provides a satisfactory contrast enhancement over much of the finger image for valleys oriented in all different directions. The value of α can be varied widely and adjusted to achieve a desirable contrast enhancement as judged by experimental results. The value of α can be as high as 90°, i.e. when there is no compounding of the angle of beam 22, but the minimum value of α is limited by reflective phenomena discussed below. It is further desirable for rays in the illuminating beam to have a component along the direction of the trace, in a direction perpendicular to the scan direction.

Figure 13A:
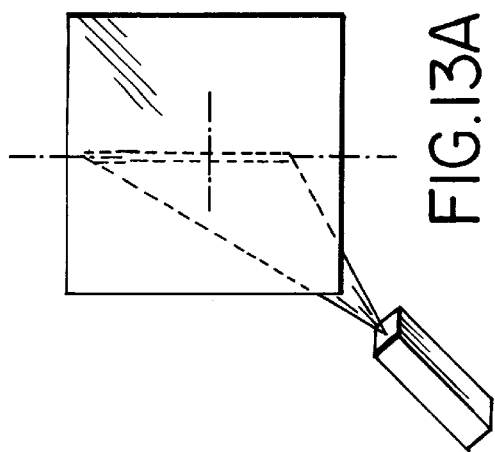
FIGS. 11–13 illustrate steps in the alignment of the illuminating beam in a finger imaging apparatus.
Figure 13B:
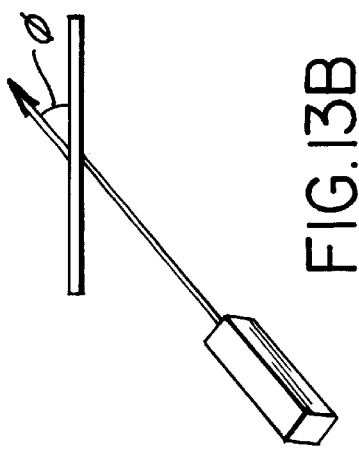
Figure 12A:
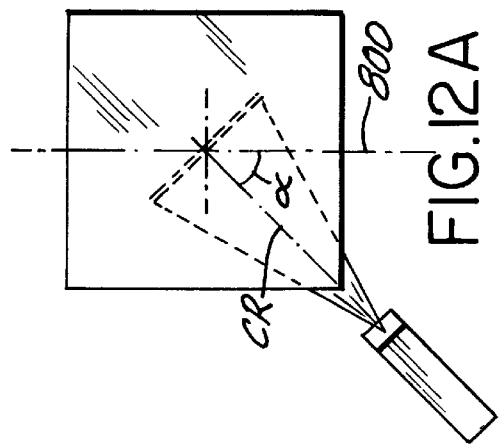
Figure 12B:
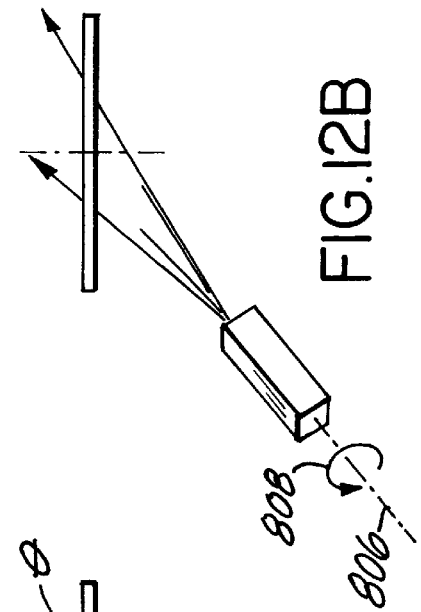
Figure 11A:
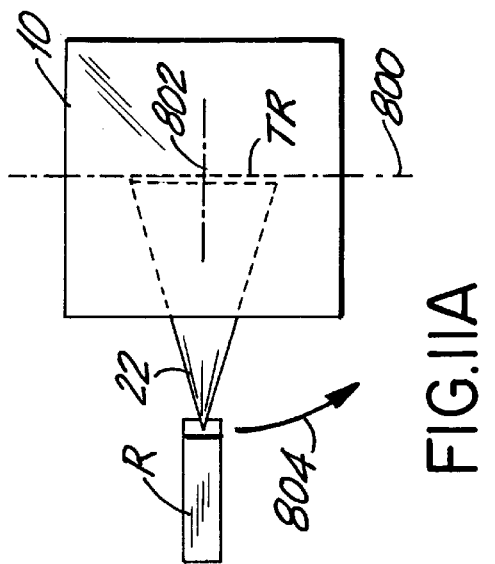
Figure 11B:
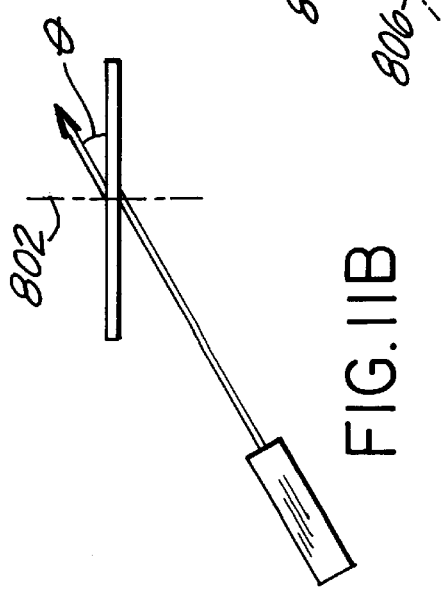

The alignment of beam 22 to generate a compounded beam angle is illustrated in FIGS. 11–13. FIGS. 11A, 12A, and 13A are top views of the respective steps illustrated in side views in FIGS. 11B, 12B, and 13B. In FIG. 11, beam 22 is aligned such that the trace TR is parallel to the line of the CCD array (that line being schematically illustrated by dashed line 800), and such that beam 22 is at angle θ.with the platen 10. The angle θ is selected to have a value large enough such that excessive light is not lost to reflection off platen 10. Once θ is set, α may be set without changing the value of θ by pivoting beam source 12 about an axis 802 perpendicular to the touching surface of platen 10, as indicated by an arrow 804, until such time as the projection of central ray CR on platen 10 forms a desired angle α with line 800, as illustrated in FIG. 12. An angle of 45° is preferred for α, since it equalizes the components of light rays in the directions parallel to and perpendicular to the line 800 of the CCD array. Once α is set, however, the trace TR is out of alignment with the line 800 of the CCD array, as seen in FIG. 12A. To return the trace to alignment with line 800, the source 12 is rotated about its axis 806 as indicated by arrow 808, until the trace is again parallel to line 800, as seen in FIG. 13A. The rotation does not change the values of α or θ, and the plane of beam 22 forms angle φ with platen 10 (FIG. 13B). The resulting angles α, θ, and φ are related by the equation introduced earlier:

$$\sin\alpha \cdot \tan\phi = \tan\theta.$$

For values of approximately α=45° and θ=20°, φ is calculated to be approximately 27° to ensure that the trace is parallel to the line of the CCD array and perpendicular to the direction of the scan. The value of θ is the angle with which the individual light rays of beam 22 travel above the touching surface of platen 10. As θ becomes smaller, an increasing portion of beam 22 is reflected by platen 10 according to well-known principles of reflection at interfaces, thus diminishing the intensity of the illumination by beam 22 at the finger. In order to minimize such effects of diminished illumination, it is desirable to provide platen 10 with an anti-reflective coating 48 (as illustrated in FIGS. 3A–C). An anti-reflective coating may be provided on any surface of the platen where light strikes at a shallow angle, and in the preferred embodiment of a platen having parallel planar opposite surfaces, it is desirable to provide both surfaces with an anti-reflective coating. Another technique for preventing reflection of beam 22 off platen 10 is to polarize beam 22 with p-polarization. Reflection of light off interfaces is a problem which has been dealt with in a wide variety of optical settings, and any of a multitude of solutions may be employed in a finger imaging apparatus.

Even when an anti-reflective coating is provided, however, it is difficult to prevent high levels of reflection of beam 22 when the beam is incident on a planar platen at an angle less than about 10°. The use of a prismatic platen, as described below with respect to FIG. 10, can overcome this difficulty and enables the use of much lower angles. Otherwise, it is preferable to select an angle θ such that:

$$\theta \geq 10° \quad (5)$$

Employing the relation sinα·tanφ=tanθ, it can be seen, for example, that when α is selected to be 45°, φ should be at least 14°, and when φ is selected to be 27°, α should be at least 20° in order to satisfy the inequality (5).

Figure 10:
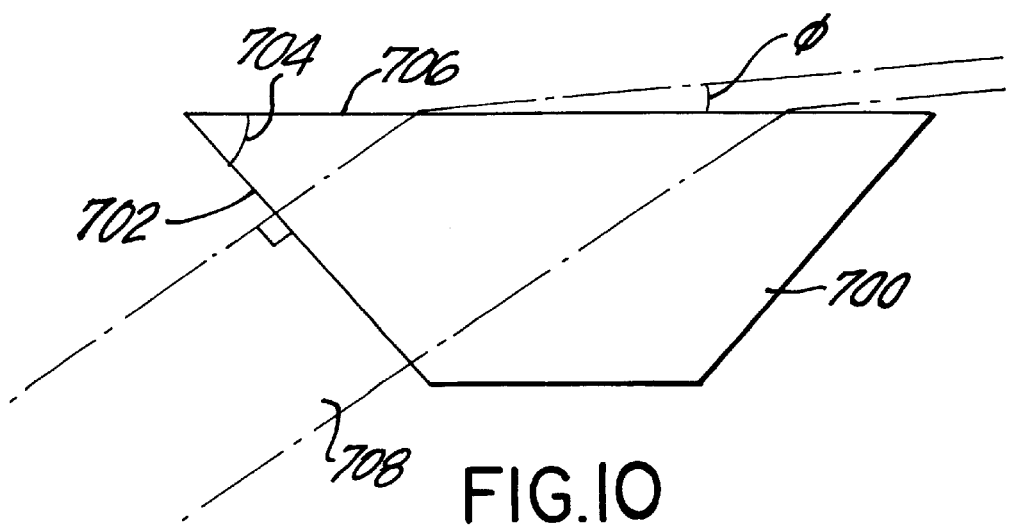
FIG. 10 is a side view of prismatic platen for use in a finger imaging apparatus.

The problem of diminishing light intensity at a low angle φ, particularly angles φ lower than 14°, can be reduced with a platen arrangement as illustrated in FIG. 10. A prismatic platen 700 has an angled light entry face 702 oriented at an angle 704 to a touching surface 706. For a glass platen 700, angle 704 can range up to approximately 42° (the Brewster angle of a glass-air interface). A light beam 708 enters prismatic platen 700 perpendicularly to light entry face 702, substantially reducing the loss of light intensity due to reflection at face 702. As angle 704 approaches 42°, angle φ approaches 0°. Of course, as φ approaches 0°, the intensity of light reaching the finger surface diminishes to zero with platen 700. While the use of very low values of φ can have the disadvantage of diminished light intensity, it has the advantage of allowing for broader illuminating light beams, as is seen in inequality (3). Sufficiently low values of φ allow the value of w to be increased to a size on the order of the width of the touching surface, thus eliminating the need for a scanning mechanism to move the illuminating light beam across the touching surface. In that case, a finger image may be obtained with a two-dimensional CCD array and a trace broad enough to cover the entire touching surface.

There is no effective change in displacement as φ is lowered to less than approximately 0.068°. Due to the limited size of the finger and the fact that most valleys curve to some extent, light can generally not travel through a valley for more than 0.3 inches without striking a ridge/valley edge. At an angle of 0.068°, light would have to travel 0.3 inches before reaching a valley floor with depth of 0.358 mils. Thus, at an angle φ of less than 0.068°, the displacement of a valley floor is too great for illuminating light even to reach the valley floor. In practice, there is little significant difference between images obtained with φ less than or equal to approximately 1.0°. At such angles, a finger "touch" image may be obtained with a two-dimensional CCD array without a moving scan mechanism.

With an understanding of the finger imaging apparatus as described above, various substitutions and modifications become apparent. Any of a number of light sources may be used to generate light beam 22, including sources employing conventional geometric optics as well as sources employing holographic beam generation techniques as in Drake et al., "Waveguide hologram fingerprint entry device," Optical Engineering 35:9, September 1996. Two separate light sources may be employed to generate a beam 22 wherein light rays travel substantially orthogonally to one another.

A finger imaging apparatus capable of imaging the finger at an angle φ equal to or approximately equal to 0°, i.e. between 1° and −1°, without light intensity loss caused by reflection off a platen, is illustrated in FIGS. 5–9 and discussed in further detail below.

Imaging optics 14 may be a conventional geometric optics imaging system with one or more lenses. Particularly where it is desirable to limit the size of the finger imaging apparatus, the imaging optics may include a fiber optic image guide in the form of a strip or bundle, or a microlens array. As discussed above, the platen may take any of a number of shapes, such as planar, prismatic, or curved. Numerous devices are available as photoelectric transducers. A variety of scan mechanisms, either mechanically, manually, or electro-optically driven, can be employed. During a scan, the imaging optics may be held stationary relative to the platen, as may a two-dimensional transducer array. With the use of an acousto-optical deflector, the light source itself need not move in order to scan the interrogating light beam across the platen.

While imaging optics 14 and transducer 16 are illustrated as being positioned perpendicularly below platen 10 and parallel to platen 10, it is not necessary that they be so oriented. Because the finger imaging apparatus images finger F through the use of scattered light, imaging optics 14 can detect an image of finger F through a wide range of angles. The distance d by which a valley portion of the finger image is displaced will be imaged differently by optics 14 depending on the angle at which optics 14 is positioned, but these differences can readily be accounted for using simple trigonometry. Preferably, imaging optics 14 is positioned out of the path of light from beam 22 which is reflected off platen 10. For example where the platen is planar, optics 14 is arranged so that the finger is not imaged from angle θ. In this way, light from internal reflection at the touching surface of the platen does not enter imaging optics 14 and does not interfere with the imaging and detection of light scattered from the finger.

SPATIAL FREQUENCY FILTERING

Because scattered light, as opposed to reflected light, is used in the imaging of the finger, it is particularly convenient to perform spatial filtering on the finger image. When w and φ satisfy inequality (4), ridge image information and ridge/valley edge information are optically separable. Ridge information is highly diffused and at substantially high spatial frequencies, whereas ridge/valley edge information is highly directional and thus at substantially low optical frequencies. In order to perform spatial filtering in the optical domain, a coherent light source, such as a laser, is conveniently used to generate beam 22. Either high-pass or low-pass spatial filtering may be performed optically to obtain a desired image.

To filter out high spatial frequencies of an image, an aperture 13 of a stop 15 is positioned along the path of light in imaging optics 14. Stop 15 then acts as an optical low-pass filter. The size of aperture 13 may be adjustable, or stop 15 may be replaceable with another stop having an aperture of a different size. Stop 15 serves to spatially filter coherent light scattered from finger F. Smaller sizes of aperture 13 result in a greater reduction of high frequency content of the image at image plane 310. In one embodiment, where imaging optics 14 consists of a converging lens having a focal length of 75 mm, aperture 13 has a diameter of 10 mm. By filtering out high spatial frequency components of the finger image, the ridge information is dramatically reduced without reducing ridge/valley information, producing a pure valley image. Ridge portions of the image have high spatial frequency and diffused optical characteristics, while regions of enhanced intensity formed by scattering from the valley wall have low spatial frequency and highly directional optical characteristics. A low-pass optical filter such as stop 15 blocks out the high-frequency ridge components and lets the low frequency valley image components pass through to CCD array 16.

Alternatively, a DC stop centered along the optic axis at the back focal plane of imaging optics 14 acts as a high-pass filter, blocking out ridge/valley image components of low spatial frequency. The low-frequency regions of enhanced brightness are thus filtered out, resulting in a ridge image of the finger, where valley portions of the finger appear black.

LIQUID FILM

Where any touching surface such as platen 10 is provided with an anti-reflective coating 48, as in FIGS. 3A–C, a layer of liquid between the finger and the platen can greatly enhance the contrast of a ridge image of the finger. The liquid layer may be quite thin, and need not fill the valley portions of the finger. Anti-reflective coating 48 is designed to provide a transition layer between the index of refraction of platen 10 and the index of refraction of air. Where a liquid is in contact with anti-reflective coating 48, a mismatch in the indices of refraction results in specular reflection of beam 22 from the touching surface of platen 10. Because light specularly reflected from platen 10 does not reach CCD array 16, regions of liquid in contact with coating 48 result in a dark portion of the finger image.

Even when w and φ do not obey the constraints of inequality (4) use of an anti-reflective coating and liquid film will result in a low contrast combined ridge and valley image with very smooth features, but with no effect of ridge direction relative to the angle of the illuminating light, image failure results.

Since the combination of a liquid film with an anti-reflective coating increases the contrast between ridge and valley regions of the finger, it becomes possible to image the finger using higher values of φ. With a liquid film, finger images may be obtained with an angle φ of up to approximately 60°.

The combination of a finger ridge with finger a oil film pressed against the platen produces the same optical effect at the surface of the platen as a ridge with a liquid film, causing scattering of incident light. In valleys and in ridge/valley edges, however, the mismatch in refractive indices between the anti-reflective coating and the liquid results in a dramatic reduction in scattered light from those valley and ridge/valley edge areas, which enables the use of higher values of φ. The higher values of φ in turn result in a brighter illumination of the ridges, giving a higher contrast ridge image.

This is in contrast to the action without an AR coating. As discussed above, the combination of a finger ridge with a ridge oil film pressed against the platen produces substantially the same optical effect, at the surface of the platen, as a ridge with liquid film or ridge with finger oil and liquid film; in valleys, however, a match in refractive indices between a liquid film and the platen reduces internal reflection at the platen surface, allowing light to be directed into the valleys with the same intensity as the light incident upon the ridges. This allows both ridge and valley light scatter to be successfully imaged. The result is a highly filtered, very soft image.

FLAT PACK CONFIGURATION

Figure 5:
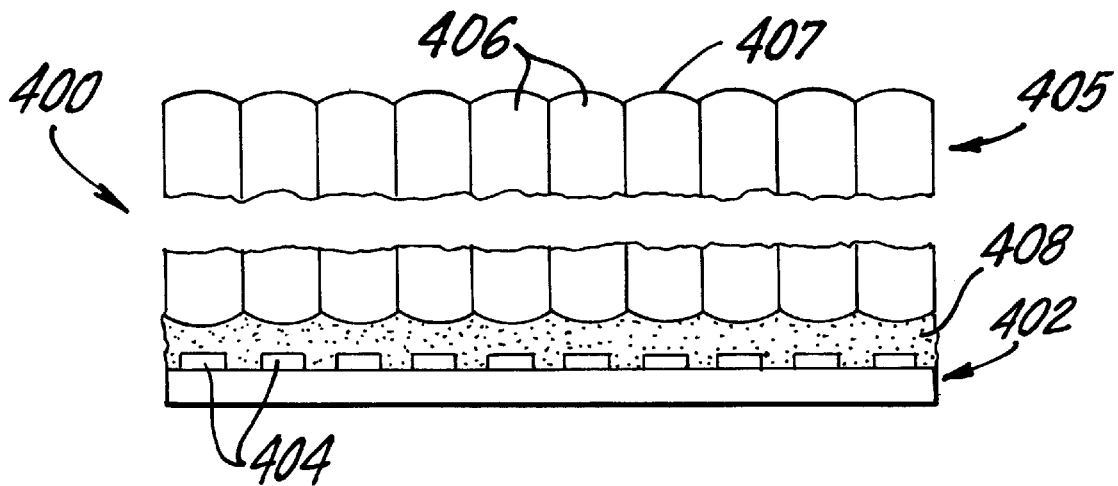
FIG. 5 is a cross-sectional illustration of another embodiment of a finger imaging apparatus in accordance with the present invention.
Figure 6:
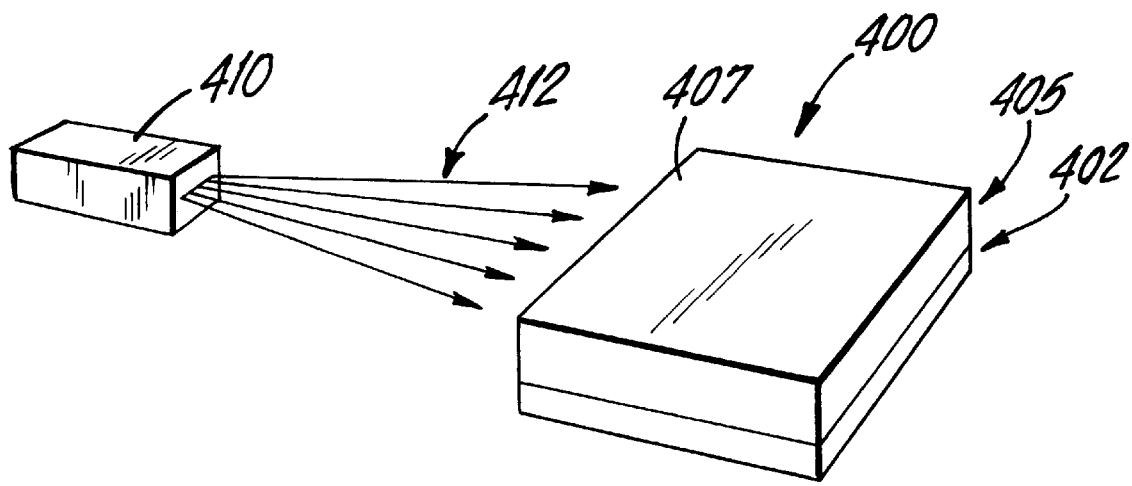
FIG. 6 is a schematic illustration of the finger imaging apparatus of FIG. 5, showing the positioning and orientation of a light source.

As illustrated in FIG. 5, another finger imaging apparatus 400 includes a two-dimensional CCD array 402 made up of a plurality of individual pixels 404. Imaging optics comprising a bundle 405 of fiber optic segments 406 is secured perpendicular to CCD array 402 by a layer of optical cement 408. The ends of optical fiber segments 406 define a planar touching surface, or platen, 407. The fiber optic segments 406 must be in intimate contact with CCD array 402. A laser source 410 (FIG. 6) generates a beam 412, with the plane of beam 412 being parallel to and immediately above planar touching surface 407.

Figure 7A:
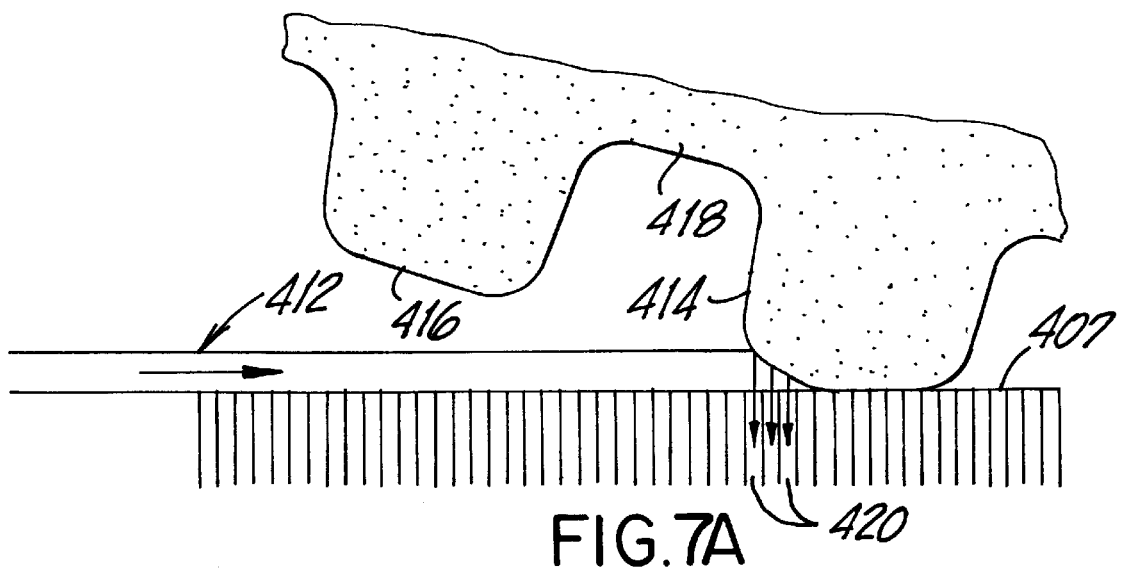
FIGS. 7A–7C are schematic illustrations of successive steps in the imaging of a finger surface using the apparatus of FIGS. 4 and 5.
Figure 7B:
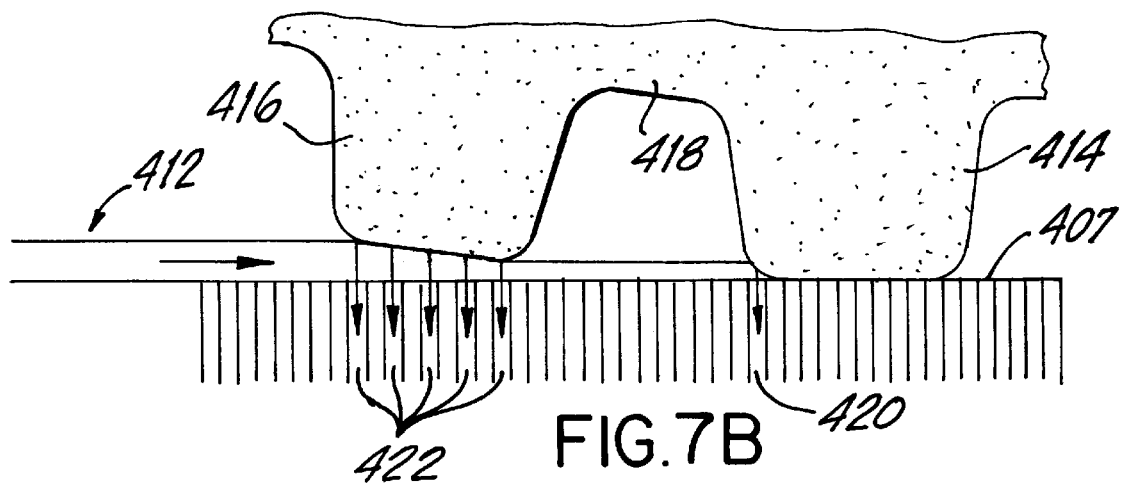
Figure 7C:
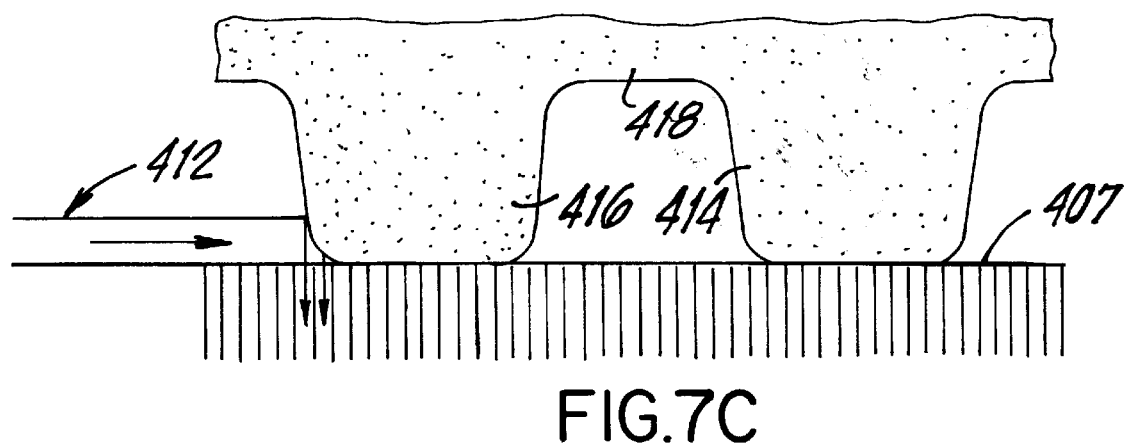

To generate a finger image in this configuration, a finger must be rolled against touching surface 407 towards laser source 410. As illustrated in FIGS. 7A–C, finger ridges 414 and 416 successively contact surface 407 as the finger is rolled on surface 407. In FIG. 6A, ridge 414 is pressed against surface 407 while ridge 416 is above surface 407. Accordingly, beam 412 travels between ridge 416 and surface 407 and strikes ridge 414. Light from beam 412 is scattered off ridge 414 and is directed into optical fibers 420 located directly below the illuminated portion of ridge 414. CCD pixels located directly below optical fibers 420 then register a "light" area of the finger image. The fiber optic imaging eliminates the need for an imaging lens, resulting in a system that is highly compact along the optic axis.

As the finger is further rolled over surface 407, ridge 416 intercepts a portion of the light from beam 412. Light scattered off ridge 416 is directed into optical fibers 422 below ridge 416. CCD pixels located below optical fibers 422 then register another "light" area of the finger image. The portion of beam 412 that travels under ridge 416 continues to be scattered off a portion of ridge 414 and to register as a light area of the finger image.

Finger imaging apparatus 400 can be understood as an apparatus which, like those of FIGS. 1–4, employs the displacement of valley images to result in an image of the finger having dark valley image portions. From inequality (3), $w < h_{min}/\tan \phi$. Since $\phi$, the angle between the illuminating beam and the touching surface 407, approaches zero, the right-hand side of inequality (3) approaches infinity, and inequality (3) is satisfied even for large values of w. Indeed, w can easily exceed the dimensions of touching surface 407, allowing the finger to be imaged without any scanning mechanism required to scan the beam across touching surface 407. In a practical system, $\phi$ ranges between 1° and −1° (the negative angle being one in which the illuminating light beam approaches the touching surface from above).

Figure 8:
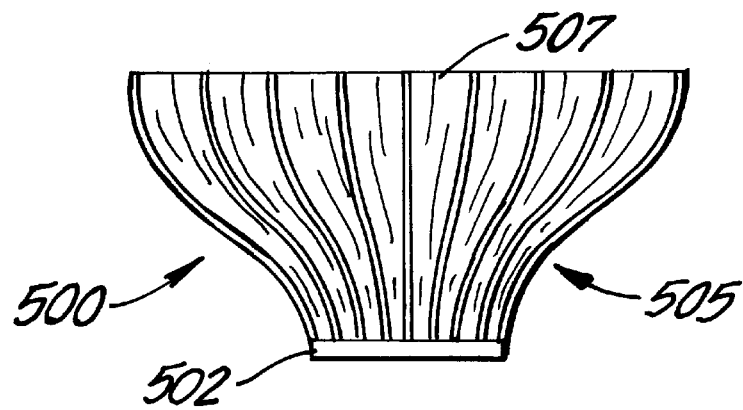
FIG. 8 is an illustration of a modified version of the finger imaging apparatus of FIG. 5.

It is often the case that a CCD array is not available in a size corresponding to a desired platen size, or that a CCD is available in the desired size but is excessively costly. In that case, a finger imaging apparatus can be provided with a platen surface larger than the CCD array. As illustrated in FIG. 8, a finger imaging apparatus includes a CCD array 502 and a shaped fiber optic bundle 505. Bundle 505 is shaped such that the ends of the optical fibers at a platen surface 507, i.e., at the input plane of bundle 505, are spaced more widely apart than at the output plane of bundle 505 positioned at CCD 502. Thus, a finger image at platen surface 507 is essentially reduced in size to fit on CCD 502.

Figure 9:
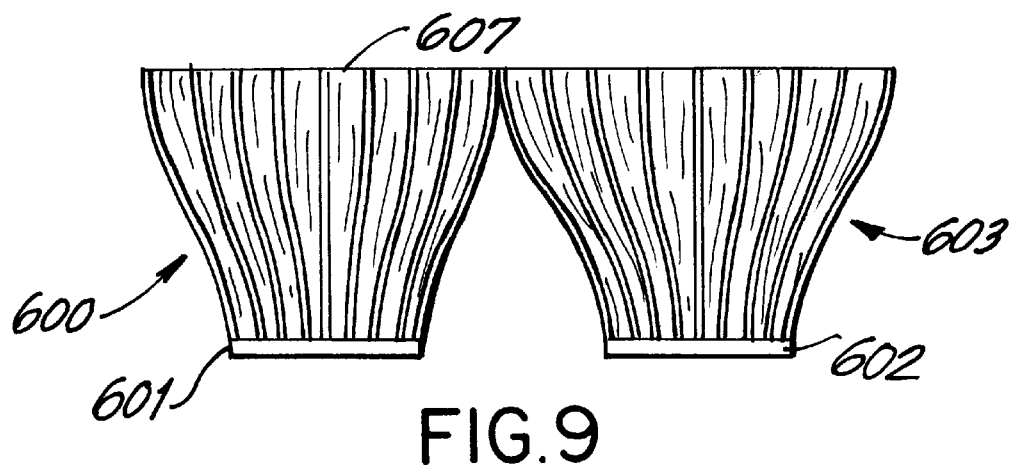
FIG. 9 is an illustration of another modified version of the finger imaging apparatus illustrated in FIG. 5.

As illustrated in FIG. 9, a single platen surface 607 of another finger imaging apparatus is read by CCDs 601 and 602. CCDs 601 and 602 receive finger images from shaped fiber optic bundles 600 and 603, respectively. Although a gap exists between CCDs 601 and 602, at the output plane of the bundles, the ends of the optical fibers at the input plane of the bundles at platen 607 surface are evenly distributed over the entire platen touching surface. Electrical signals from individual CCDs 601 and 602 can be combined to generate a single image with no gap or loss of image between the CCDs. A finger imaging apparatus can be formed in this way using any number of CCDs, each with its respective shaped fiber optic bundle, allowing a platen surface to be read by several small, inexpensive CCDs, rather than a single large, expensive CCD.

Figure 14:
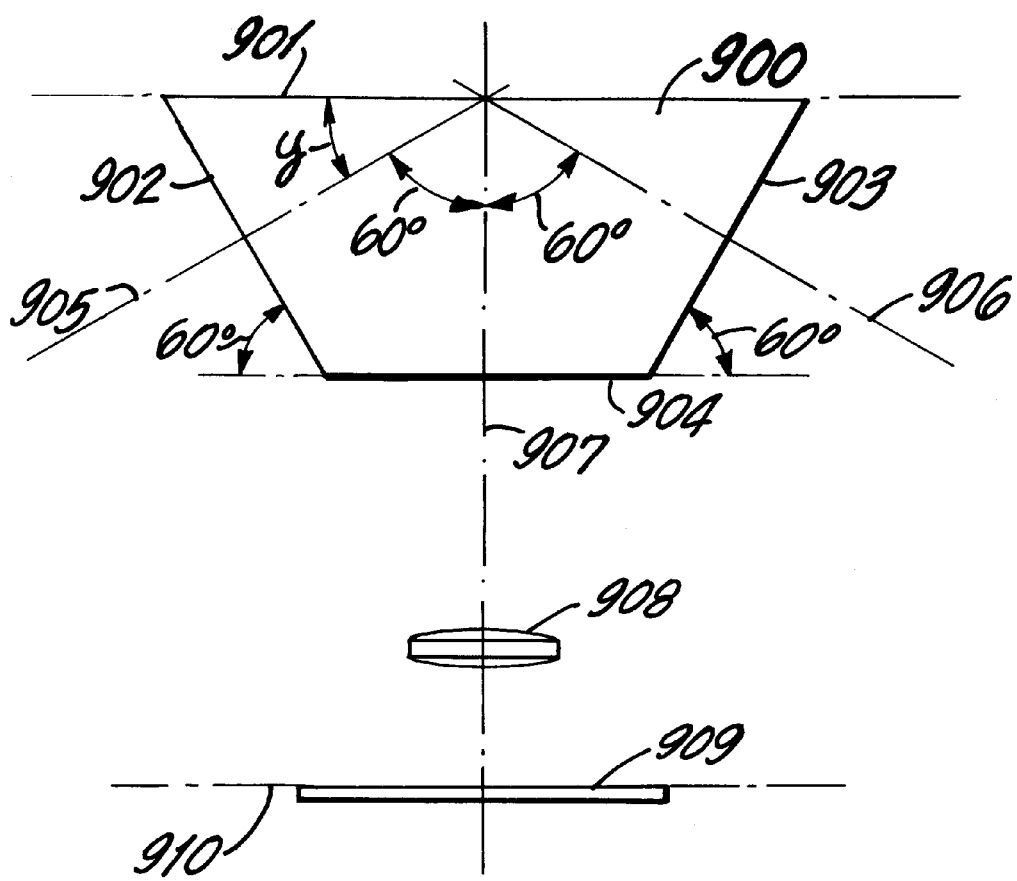
FIG. 14 illustrates a further embodiment of the invention in which there is a substantial angle between the mirror axis and the imaging axis.

FIG. 14 represents an embodiment in which a well defined ridge image is obtained from scattered light having relatively high frequency components. The higher frequency components of the image are obtained because the scattered light images are developed along an axis which is substantially removed from the axis of the mirror image.

More particularly, as shown in FIG. 14, a platen 900 has a flat planar touching surface 901, an interrogating light receiving surface 902 and a surface 903 through which mirror image output light is provided. The surfaces 902 and 903 are at an angle of 60° to the plane of the surface 901 and 904. This means that an interrogating light beam along the axis 905 that is perpendicular to the surface 902 will impinge on the touching surface 901 at an angle of 60° to the perpendicular and will provide a mirror light image along the axis 906 at an angle of 60° to the axis 907. The axis 907 is perpendicular to the touching surface 901. Scattered light from finger ridges at the touching surface 901 is imaged by an imaging lens 908 along the image axis 907 at a photoelectric transducer array 909.

In the preferred embodiment, the interrogating light beam along the axis 905 is a two dimensional source of light so as to provide full area illumination at the finger touching surface 901. In that embodiment, the transducers 909 are an area array of transducers at the plane 910. In such an embodiment, a mechanical scan of the finger by the interrogating light beam is not required.

To minimize scale distortions and aberrations, the plane of the area array of transducers at 909 is parallel to the plane of the touching surface 901.

Because of the substantial 60° angle between the axis 907 of the scattered light imaged at the array 909 and the axis 906 of the mirror image, the amount of relatively high frequency component in the scattered light image at the array 909 will be substantial. Thus, the ridge image of the finger provided at the array 909 will have significant detail.

It is believed that as long as this angle between axes 907 and 906 is greater than forty degrees (40°), improved ridge image detail will be provided. This means that the angle y between the plane of the touching surface 901 and the interrogating light beam axis should be less than forty-nine degrees (49°).

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof

What is claimed is:

1. An optical finger image system comprising:
   a platen having a touching surface to receive and support a finger to be interrogated,
   a light beam source providing an interrogating light beam, said light beam providing a trace at said touching surface, said trace having a maximum width and a maximum length, the maximum width being less than or equal to the maximum length, said width of said trace being no greater than approximately $2h_{min}/\tan \Phi$, wherein $h_{min}$ is a minimum depth of a valley portion of the finger, said light beam source being oriented with respect to said platen such that said light beam forms a predetermined angle Φ with said touching surface, said light beam illuminating a surface of a finger applied thereto, imaging optics optically downstream from said platen for directing onto an image plane light from said interrogating light beam scattered by a finger on said touching surface, and a photoelectric transducer at said image plane, light detected by said photoelectric transducer being restricted to light falling within a window area, said window area being positioned such that an illuminated ridge portion of said finger is imaged within said window, said predetermined angle Φ being sufficiently small such that any image of an illuminated valley floor portion of said finger is projected outside said window area.

2. The optical finger image system of claim 1 wherein said light beam includes a central ray, said central ray forming a predetermined angle θ with said touching surface, and wherein a perpendicular projection of said central ray on said touching surface forms a predetermined angle α with said trace such that said predetermined angles Φ, α, and θ satisfy the equation sinα·tanΦ=tanθ.

3. The optical finger image system of claim 2 wherein said predetermined angle θ is no greater than approximately 60°.

4. The optical finger image system of claim 2 further comprising a low-pass spatial filter between said touching surface and said transducer.

5. The optical finger image system of claim 2 further comprising an additional light source, said additional light source providing light rays substantially orthogonal to light rays in said interrogating light beam.

6. The optical finger image system of claim 2 wherein said predetermined angle α is approximately 45° and θ is in the range of 5° to 30°.

7. The optical finger image system of claim 2 wherein said photoelectric transducer is offset from alignment with the center of said trace.

8. The optical finger image system of claim 1 further comprising a liquid film on said touching surface.

9. An optical finger image system comprising:

a platen having a touching surface to receive and support a finger to be interrogated, a light beam source providing an interrogating light beam, said light beam providing a trace at said touching surface, said trace having a maximum width and a maximum length, the maximum width being less than or equal to the maximum length, said light beam source being oriented with respect to said platen such that said light beam forms a predetermined angle Φ with said touching surface, said light beam illuminating a surface of a finger applied thereto, imaging optics optically downstream from said platen for directing onto an image plane light from said interrogating light beam scattered by a finger on said touching surface, and a photoelectric transducer at said image plane, light detected by said photoelectric transducer being restricted to light falling within a window area, said window area being positioned such that an illuminated ridge portion of said finger is imaged within said window, said predetermined angle Φ being sufficiently small such that any image of an illuminated valley floor portion of said finger is projected outside said window area, said light beam including a central ray, said central ray forming a predetermined angle Φ with said touching surface, and wherein a perpendicular projection of said central ray on said touching surface forms a predetermined angle α with said trace such that said predetermined angles Φ, α and θ satisfy the equation sinα·tanΦ=tanθ and such that θ≧10°.

10. An optical finger image system comprising:

a platen having a touching surface to receive and support a finger to be interrogated, a light beam source providing an interrogating light beam, said light beam providing a trace at said touching surface, said light beam source being oriented with respect to said platen such that said light beam forms a predetermined Φ with said touching surface, said light beam illuminating a surface of a finger applied thereto, imaging optics optically downstream from said platen for directing onto an image plane light from said interrogating light beam scattered by a finger on said touching surface, and a photoelectric transducer at said image plane, light detected by said photoelectric transducer being restricted to light falling within a window area, said window area being positioned such that an illuminated ridge portion of said finger is imaged within said window, said predetermined angle Φ being sufficiently small such that any image of an illuminated valley floor portion of said finger is projected outside said window area, and wherein $h_{min}$ is a minimum depth of a valley portion of the finger, v is an overlap distance between an image of said trace and said transducer, and m is the magnification of said image, where $h_{min}=(v/m)\tan\Phi$.

11. An optical finger image system comprising:

a platen having a touching surface to receive and support a finger to be interrogated, a light beam source providing an interrogating light beam, said light beam providing a trace at said touching surface, said light beam source being oriented with respect to said platen such that said light beam forms a predetermined angle Φ with said touching surface, said light beam illuminating a surface of a finger applied thereto, said predetermined angle Φ is between approximately 1.0° and approximately −1.0°.

12. The optical finger image system of claim 11 further comprising an anti-reflective coating on said touching surface.

13. In an optical finger image system having at least one interrogating light beam for illuminating a finger placed against a finger touching surface of a platen to provide a modulated light beam, the system having an imaging segment for imaging the modulated light into a photo-electric transducer at an image surface to provide a finger image, the improvement comprising:

said finger touching surface being substantially dry, the interrogating light beam having an angle of incidence that is more than 30° from the normal to the finger touching surface at the place where a finger on the surface is being interrogated, the imaging segment providing the finger image at the image surface by focusing only those rays of the modulated light beam that are within the maximum angle of refraction from the finger touching surface of the platen, and the finger image at the image surface being provided in part by light from said interrogating light beam which is modulated by finger surface that is out of contact with the platen.

14. The optical finger image system of claim 13 wherein said interrogating light beam has first and second components substantially orthogonal to one another.

15. The optical finger image system of claim 13 further comprising an anti-reflective coating on said touching surface.

16. The optical finger imaging system of claim 14 further comprising an anti-reflective coating on said touching surface.

17. The optical finger image system of claim 13 wherein the interrogating light beam provides a trace having the shape of a slit at said finger touching surface.

18. The optical finger image system of claim 17 wherein the width of said trace is a function of a minimum depth of the valley portion of the finger and specifically less than approximately twice the minimum depth of the valley portion of the finger divided by the co-tangent of said angle of incidence of said interrogating light beam to the finger touching surface.

19. The optical finger image system of claim 16 wherein the interrogating light beam provides a trace having the shape of a slit at said finger touching surface.

20. The optical finger image system of claim 17 wherein said photoelectric transducer is offset from alignment with the center of said trace.

21. The optical finger image system of claim 13 further comprising a low pass spatial frequency filter between said finger touching surface of said image plane.

22. The optical finger imaging system of claim 13 further comprising a high pass spatial frequency filter between said finger touching surface and said image plane.

23. The optical finger image system of claim 14 further comprising a loss pass spatial frequency filter between said finger touching surface of said image plane.

24. The optical finger image system of claim 14 further comprising a high pass spatial frequency filter between said finger touching surface and said image plane.

25. The optical finger image system of claim 13 further comprising:
    a fiberoptic bundle, said fiberoptic bundle having a first end constituting said touching surface and a second end in intimate contact with the photoelectric transducer at said image surface.

26. The optical finger image system of claim 25 wherein said interrogating light beam has an angle with said finger touching surface that is between approximately plus 1.0° and approximately minus 1.0°.

27. The method of optically imaging a finger object comprising the steps of:
    interrogating the finger object on a platen having a dry touching surface with an interrogating light beam having an angle of incidence that is more than 30 degrees from the normal to the finger touching surface at the place where the finger on the platen surface is being interrogated,
    using said light beams to interrogate a finger surface that is out of contact with the platen to provide a portion of the modulated light that is to be focused on an image surface, and
    focusing only those rays of the modulated light beam that are within the maximum angle of refraction from the finger touching surface of the platen to provide a finger image at an image surface.

28. The method of claim 27 wherein said step of interrogating constitutes interrogating said finger object with first and second light beam components providing orthogonal interrogation components at said touching surface.

29. The method of claim 28 further comprising the steps of:
    rolling the finger being interrogated on the finger touching surface of the platen while interrogating said rolled finger with an interrogating light beam that has an angle with the plane of the platen that is between −1° and +1° to the plane of the platen.

30. In an optical finger image system having at least one interrogating light beam for illuminating a finger placed against a finger touching surface of a platen to provide a modulated light beam, the system having an imaging segment for imaging the modulated light into a photo-electric transducer at an image surface to provide a finger image, the improvement comprising:
    said finger touching surface having an anti-reflective coating and a liquid layer on said anti-reflective coating,
    the interrogating light beam having an angle of incidence that is more than 30° from the normal to the finger touching surface at the place where a finger on the surface is being interrogated,
    the imaging segment providing the finger image at the image surface by focusing only those rays of the modulated light beam that are within the maximum angle of refraction from the finger touching surface of the platen, and
    the finger image at the image surface being provided in part by light from said interrogating light beam which is modulated by finger surface that is out of contact with the platen.

* * * * *